(No Model.)
A. H. THOMAS.
Holdback.
No. 243,412. Patented June 28, 1881.
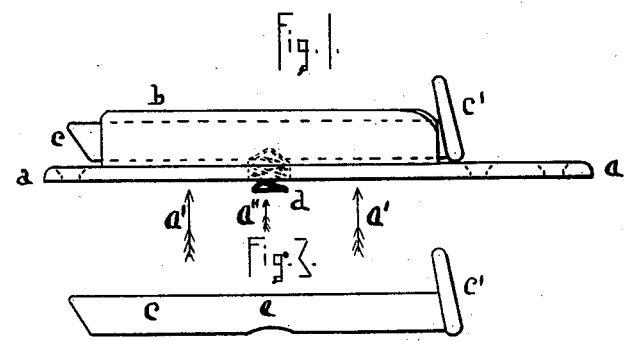
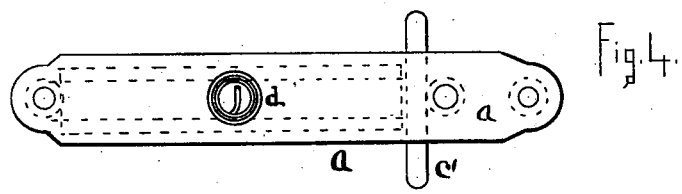
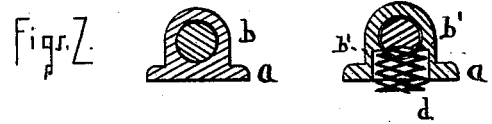
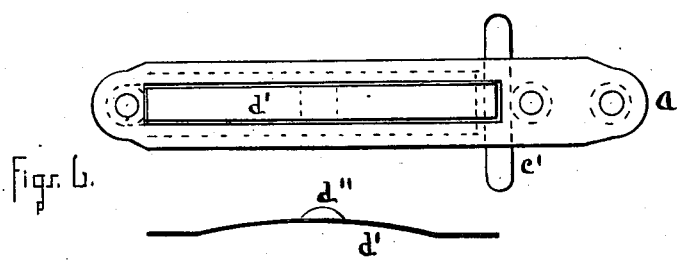
Witnesses:
S. F. Parker
R. L. F. Parker
Abner H. Thomas.
Inventor.

UNITED STATES PATENT OFFICE.

ABNER H. THOMAS, OF ITHACA, NEW YORK, ASSIGNOR TO I. DE ETTE THOMAS AND LUKE T. MERRILL, OF SAME PLACE.

HOLDBACK.

SPECIFICATION forming part of Letters Patent No. 243,412, dated June 28, 1881.

Application filed May 2, 1881. (No model.)

*To all whom it may concern:*

Be it known that I, ABNER H. THOMAS, a citizen of the United States, residing at Ithaca, Tompkins county, New York, have invented an Improved Holdback Fixture or Fastener, of which the following is a specification.

My object is to render a socket-and-slide holdback-fastener secure and to prevent rattling of the bolt in its socket; and the nature of my invention will be apparent as I describe it.

Figure 1 is a side elevation of my device. Figs. 2 are sections of the same through the socket, bolt, and bed-plate. Fig. 3 is a detached side view of the bolt; Fig. 4, a view from beneath the bed-plate. Fig. 5 is a view of the holdback metallic loop made as part of the bolt, which is seen in section; and Figs. 6 show an elliptic spring arranged to be held in place against the bolt when the fastener is secured to the thill.

In the figures, $a$ is the bed-plate of the fastener, with the socket $b$ made as part of the bed-plate, with the bolt or sliding-rod $c$ in the socket, (in Fig. 1,) to the forward end of which bolt is fast the holdback-loop $c'$; and $d$ is a spiral spring in a bed cut for it in the bed-plate portion of the socket. In the bolt or the sliding rod $c$ is an angular, circular, or flattened place, $e$, against which the spring $d$ bears, holding the bolt in the socket, so as not to jar out while the wagon is running, as well as preventing the rattling of the bolt in the socket. This spring, which may be single or double, is made sufficiently firm to do this by compression, and hence in Fig. 1 is shown as extending below the plate of the socket; but when the fastener is screwed upon the thill by the screw-holes shown by dotted lines in Fig. 1, the spring is in its bed in the socket-plate. The flattened, curved, or angular place on the bolt is so shaped that when the forward draft on the loop $c'$ is a little greater than necessary for the purposes just stated the bolt slides out of the socket, the loop being fast to the holdback-strap.

It will be seen that I improve that class of self-detachable holdback-fasteners which have the sliding rod or bolt $c$ adjustable in a socket sufficiently long to resist the leverage caused by the loop $c'$ on the front end of the socket, so that when the horse holds the wagon back it does so by the loop bearing against the front end or shoulder of the socket; but if any accident happens, the loop draws the bolt out of the socket and the thills fall; or this result may be produced by any of the rotating whiffletrees or other devices by which the tugs are detached at the will of the driver.

The spring $d$ is seen by Fig. 4 to be slightly conical, the apex of the truncated cone being upward. In Fig. 1 the top of the single spring is shaped angularly. In Fig. 2 the right-hand figure shows the spring fitting the curve of the bolt, and that it is double. In Figs. 6 an elliptical spring, $d'$, is seen in an excavation in the bed-plate, and at $d''$ the same spring is shown detached.

It is manifest that compressible springs can be put about the bolt as well as arranged in other ways that I need not fully describe, since I have stated that my object is to use a spring to retain the bolt in its place in ordinary use of the wagon, yet allow it to be easily detached and to prevent rattling of the bolt. The elliptical spring is either made fast to the bed-plate or is loose until the fastener is screwed to the thills.

In the right-hand figure of Fig. 2 it will be noticed that at the top of the excavation in the bed-plate for the spring, and just above the bed-plate proper, (for the socket is made as part of the bed-plate,) there are two shoulders, $b'\ b'$. These are for the spiral spring to rest against, so that it shall not enter too far into the cavity for the bolt. The same shoulders are used with the elliptical spring. On top of the elliptical spring is a knob, $d''$, that fits the slight hollowing of the bolt $c$, and this knob may be also used on top of the spiral spring or springs.

I claim—

A spring, $d$, inserted in the cavity of the base $a$ of the rod-socket $b$, and having a friction-bearing on the rod $c$, adjusted or arranged to prevent the escape of the rod $c$ by usual running contingencies of the vehicle, but allowing the rod to escape whenever the traces are detached, as set forth.

ABNER H. THOMAS.

Witnesses:
S. J. PARKER,
WM. J. TOTTEN.